United States Patent [19]
Matsumoto et al.

[11] Patent Number: 5,084,837
[45] Date of Patent: Jan. 28, 1992

[54] FIFO BUFFER WITH FOLDED DATA TRANSMISSION PATH PERMITTING SELECTIVE BYPASS OF STORAGE

[75] Inventors: Satoshi Matsumoto; Futoshi Miyamae; Daisuke Azuma; Souichi Miyata, all of Nara, Japan

[73] Assignee: Sharp Kabushiki Kaisha, Osaka, Japan

[21] Appl. No.: 299,028

[22] Filed: Jan. 19, 1989

[30] Foreign Application Priority Data

Jan. 22, 1988 [JP] Japan .................. 63-12786
Jan. 22, 1988 [JP] Japan .................. 63-12787
Jan. 22, 1988 [JP] Japan .................. 63-12788

[51] Int. Cl.$^5$ ............................. G06F 15/16
[52] U.S. Cl. ...................... 395/250; 364/931; 364/931.4; 364/940; 364/940.4; 364/940.81; 364/926.1; 364/926.2; 364/DIG. 2
[58] Field of Search ... 364/200 MS File, 900 MS File

[56] References Cited

U.S. PATENT DOCUMENTS 3,680,057  7/1972  Blessin et al. ............. 364/200
4,672,646  6/1987  Van Maren ................ 377/70
4,833,655  5/1989  Wolf et al. ................ 365/221
4,958,274  9/1990  Dutton et al. ............. 364/200

FOREIGN PATENT DOCUMENTS 58-96343   6/1983  Japan .
60-205647 10/1985  Japan .

Primary Examiner—Thomas C. Lee
Assistant Examiner—William M. Treat

[57] ABSTRACT

A first-in first-out type memory is used as a buffer for data transfer between asynchronous systems. This buffer memory has a minimum delay elastic buffer function in which the number of data storage stages is changed according to the data transfer situation in an output portion of the memory. The data storage memory includes a folded type data transmission path with a going path and a returning path respectively provided with data storage devices of the same number, bypassing paths for coupling corresponding data storage devices in the going path and the returning path, and a valid data detector provided corresponding to each of the bypassing paths for detecting the presence or absence of valid data in a data storage device closer to an input/output portion than a corresponding bypassing path and making the bypassing path enabled or disabled according to the result of the detection.

19 Claims, 6 Drawing Sheets

FIFO BUFFER WITH FOLDED DATA TRANSMISSION PATH PERMITTING SELECTIVE BYPASS OF STORAGE

BACKGROUND OF THE INVENTION

1. Field of the Invention

The present invention relates generally to a buffering data storage device, and more particularly, to a configuration of a first-in first-out (FIFO) type data storage device interposed in a data transmission path and having a number of storage stages which are changed according to the data transfer situation in the output portion thereof.

2. Description of the Background Art

If and when data transmission is made between asynchronous systems, a buffer for regulating data transfer is generally provided between the processors in each of the systems. A first-in first-out (FIFO) memory for outputting received data according to the input order is generally used as such a buffer.

Figure 1:
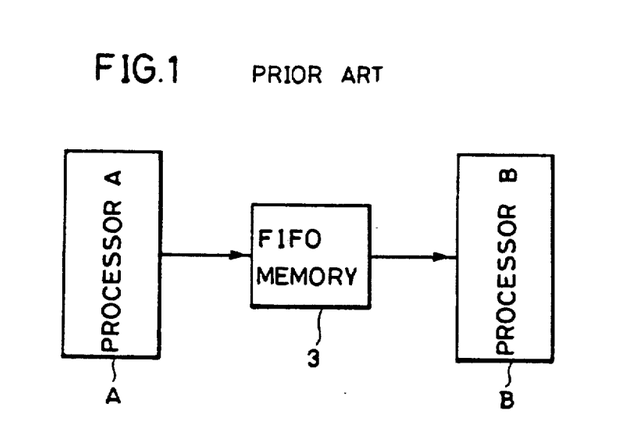
FIG. 1 is a diagram showing the connection between conventional asynchronous systems using an FIFO memory having a fixed number of storage stages as a buffer memory.

In FIG. 1, when data transfer is made from a processor A to a processor B, which processors are asynchronously operated, an FIFO memory 3 is provided between the processor A and the processor B. This FIFO memory 3 stores data applied from the processor A in the received order, to output the stored data in the same order as the input order in response to a read-out designating signal from the processor B. In addition, the FIFO memory 3 monitors the storing state therein, to apply a data transfer inhibiting signal to the processor A when the storing state therein becomes full.

Since this FIFO memory 3 need not receive an address indicating a data storage location from the processors A and B, the interface with a processor (or a system) becomes simple. Thus, the FIFO memory 3 is widely used as a buffer for transferring data between systems which are asynchronously operated or between processors having different speeds of data processing.

The time required for a data processor to process data differs depending on the content of applied data and the content of processing required in the processor. Thus, in an asynchronous system, a group of resultant data packets processed in each of the processors A and B is not always transmitted at the same time interval. As a result, the amount of data stored in the FIFO memory 3 is not fixed, and a group of data transmitted from the processor A stays in the FIFO memory 3 due to the difference in processing time in the processor B. In order to decrease such a stay to the utmost, a data transfer control signal must be received and sent between each of the processors A and B and the FIFO memory 3, so which increases the amount of hardware in the processor.

Additionally, if and when the FIFO memory 3 includes, for example, a multi-stage shift register, the number of storage stages does not vary during the operation, so that respective times required for transferring one data are the same irrespective of the amount of data to be transferred. Thus, in this case, if only one word data (one packet data) exists, for example, there is delay in the data transfer, corresponding to the number of storage stages in the FIFO memory. As a result, data transmission is not made at high speed.

SUMMARY OF THE INVENTION

An object of the present invention is to provide an improvement of a conventional buffering FIFO memory.

Another object of the present invention is to provide a data storage device having a buffer function by which the stay of a group of transmitted data caused by the difference in processing times in a processor can be decreased to the utmost.

Still another object of the present invention is to provide a data storage device having a number of storage stages which are is changed according to the storing state of data to be transmitted and comprising a minimum delay elastic storage function for always transferring data at a possible minimum delay time.

A further object of the present invention is to provide a buffering FIFO memory interposed in a data transmission path and having the delay time changed according to the number of input data so as to always transfer data at a minimum delay time.

The data storage device according to the present invention comprises a data transfer path having a folded configuration including a going path and a returning path respectively provided with data storage units of the same number, bypassing paths for linking corresponding data storage units in the going path and the returning path, and valid data detectors each provided for corresponding bypassing paths for detecting the presence or absence of valid data in the data storage units closer to an input/output portion than the corresponding bypassing path, to render the bypassing path active or inactive according to the result of the detection.

In this structure, if and when valid data exists in data the storage unit in the preceding stage closer to the data input/output portion than the bypassing path, inputted data is transferred to the data storage unit of the succeeding stage in the going path. On the contrary, when valid data does not exist, the inputted data is transferred through the bypassing path to the data storage unit in the returning path.

Thus, the number of storage stages is changed according to the data transfer situation in the output portion, so that the inputted data can be stored up to the maximum storage capacity of the data storage device and the stored data are sequentially outputted, in the order in which the data are input, at the minimum delay time according to the data transfer situation.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 2:
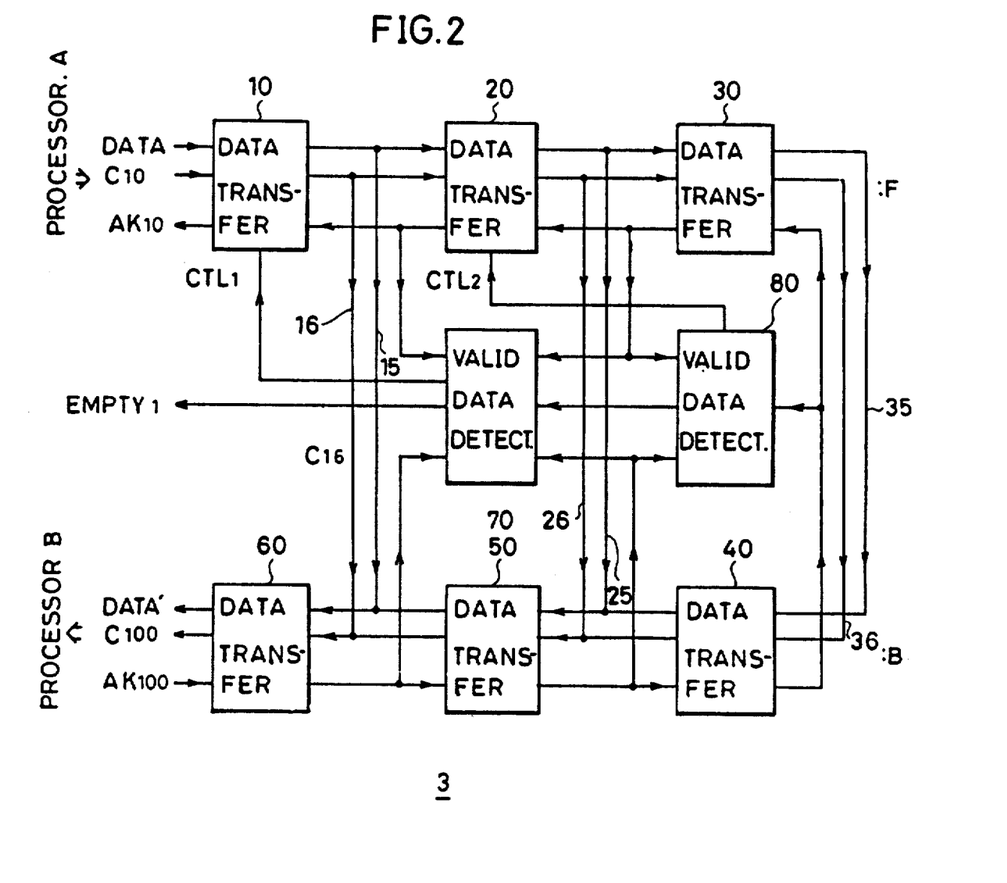
FIG. 2 is a diagram showing a configuration of a data storage device according to one embodiment of the present invention.

FIG. 2 shows one example of a configuration of a data storage device according to one embodiment of the present invention. In FIG. 2, a data storage device having three storage stages is shown as an example. This data storage device is, for example, used as a buffer interposed in a data transmission path between the processors A and B shown in FIG. 1.

Referring to FIG. 2, a data storage device 3, according to one embodiment of the present invention includes data transfer devices 10, 20, 30, 40, 50 and 60 for sequentially transferring applied data and valid data detectors 70 and 80 for each selecting a data transfer path according to the data storing state in each of the units.

A data transmission path in the data storage device 3' has a folded configuration with a going path F and a returning path B. The going path F is provided with data transfer devices 10, 20, and 30. The returning path B is provided with data transfer devices 40, 50 and 60. The data transfer devices 10 to 60 are connected in a cascade manner, to form a single data transmission path from an input portion to an output portion.

In order to provide a data transfer path according to the data storing state in the data storage device 3', bypassing paths 15 and 16 are provided between the data transfer devices 10 and 60, and bypassing paths 25 and 26 are provided between the data transfer devices 20 and 50. The data transfer devices 30 and 40 are connected to each other by data transmission paths 35 and 36. The bypassing paths 15, 25 and 35 transfer data to be transmitted (in n-bit width in FIG. 2), and the bypassing paths 16, 26 and 36 transfer a data transmission signal (a signal indicating transmission of valid data).

The valid data detector 70 detects the presence or absence of stored data in the data transfer device 60, to select a transmission path of data outputted from the data transfer device 10 according to the result of the detection. More specifically, the valid data detector 70 renders the bypassing paths 15 and 16 active when valid data is not stored in the data transfer device 60, which otherwise would render the bypassing paths 15 and 16 inactive.

Similarly, the valid data detector 80 renders the bypassing paths 25 and 26 active or inactive depending on the absence or presence of stored data in the data transfer device 50. Referring now to FIG. 1, the operation will be briefly described. In the following description, the data transfer devices 10 and 60 closest to the data input/output portion are respectively referred to as data transfer devices in the first stages of the going path F and the returning path B.

In an initial state, valid data does not exist in the data transfer devices 10 to 60. In this state, the valid data detectors 70 and 80 respectively control the data transfer devices 10 and 20 by the control signals CTL1 and CTL2 so as to set respective data output paths to bypassing paths 15 and 16 and 25 and 26.

First, let us consider a case in which a transmission acknowledging signal AK100 applied from the processor B to the data transfer device 60 in the first stage of the returning path B is in an active state indicating permission of data transmission. When data DATA and a transmission signal C10 are applied from the processor A to the data transfer device 10 in the first stage of the going path F, the input data DATA and the transmission signal C10 are transferred to the data transfer device 60 in the first stage of the returning path B since the bypassing paths 15 and 16 have been already selected by the control signal CTL 1 as data transmission paths thereof. The data transfer device 60 applies the applied data DATA and transmission signal C10 to the processor B as output data DATA' and a transmission signal C100 since data transmission is acknowledged by the transmission acknowledging signal AK100. On this occasion, data transfer to the data transfer device 10 is acknowledged to the processor A by a data transmission acknowledging signal AK 10 from the data transfer device 10. As described above, in a case in which data is not stored in the data storage device 3', when the transmitted data DATA and the transmission signal C10 are applied to the device 3', the data DATA and the transmission signal C10 are outputted to the processor B through the bypassing paths 15 and 16 and the data transfer device 60 at the minimum delay time.

Then, let us consider a case in which the transmission acknowledging signal AK100 is in a transmission inhibiting state. When the data DATA and the transmission signal C10 from the processor A reach the data transfer device 10, the data DATA and the transmission signal C10 are transferred to the data transfer device 60 through the bypassing paths 15 and 16 since the bypassing paths 15 and 16 are rendered active in response to the control signal CTL1 from the valid data detector 70. On this occasion, since the transmission acknowledging signal AK100 is in the transmission inhibiting state, the data and the transmission signal transferred to the data transfer device 60 are latched therein. In this state, when the transmitted data DATA and the transmission signal C10 are applied to the data transfer device 10, the valid data detector 70 detects the presence of valid data in the data transfer device 60, to inhibit data transfer through the bypassing paths 15 and 16 by the control signal CTL1. Thus, the data DATA and the transmission signal C10 applied to the data transfer device 10 are transferred to the data transfer device 20 in the second stage of the going path F. Since valid data has not existed yet in the data transfer device 50 in the second stage of the returning path B, the bypassing paths 25 and 26 in the second stage are in an active state. The data transfer device 20 transfers the applied data and transmission signal to the data transfer device 50 in the second stage of the returning path B through the bypassing paths 25 and 26 in the active state. The transmission acknowledging signal AK100 applied to the data transfer device 60 is in the inhibiting state. Thus, since the transmission acknowledging signal applied to the data transfer device 50 is also in the inhibiting state, the data transfer device 50 latches the applied data and the inputted signal, and does not transfer the same.

Thereafter, when the next data DATA and transmission signal C10 are further applied to the data transfer device 10, the bypassing paths 15, 16, 25 and 26 are all in the inactive state by the valid data detectors 70 and 80 since significant data has already existed in the data transfer devices 50 and 60 in the returning path B. Thus, the further applied data DATA and transmission signal C10 are transferred to the data transfer device 30 in the final stage of the going path F through the data transfer devices 10 and 20 in the going path F, and also transferred to the data transfer device 40 in the final stage of the returning path B through the transmission paths 35 and 36. However, since the transmission acknowledging signal AK100 is in the inhibiting state, the data transfer device 40 latches the applied data, and does not output data. Thereafter, when the transmission acknowledging signal AK100 enters the acknowledging state, data and transmission signals latched in the data transfer devices 40 to 60 in the returning path B are sequentially transferred to the preceding stage (an apparatus closer to the output portion in the returning path B), to be transferred to the processor B as output data DATA' and a transmission signal C100. Meanwhile, a signal EMPTY is a signal indicating the absence of valid data in both the going path F and the returning path B of the data storage device 3', which is applied to the processor A.

As described in the foregoing, the presence or absence of valid data in the data transfer devices in stages preceding the bypassing path is detected in the returning path B, so that an output path for data and a transmission signal in a data transfer device in the going path F is selected according to the result of this detection. Thus, in the asynchronous system as shown in, for example, FIG. 1, input data DATA applied at arbitrary time intervals longer than the time intervals inherent to the system is received up to the limit of the capacity of the data storage device and outputted in the same order as the data input order since the number of storage stages in the data storage device adaptively varies according to the data transfer situation on an output side (in a returning path) of the data storage device. Consequently, data can be always transferred at a possible minimum delay time. Description is now made on a specific configuration and an operation of the data storage device shown in FIG. 2.

Figure 3:
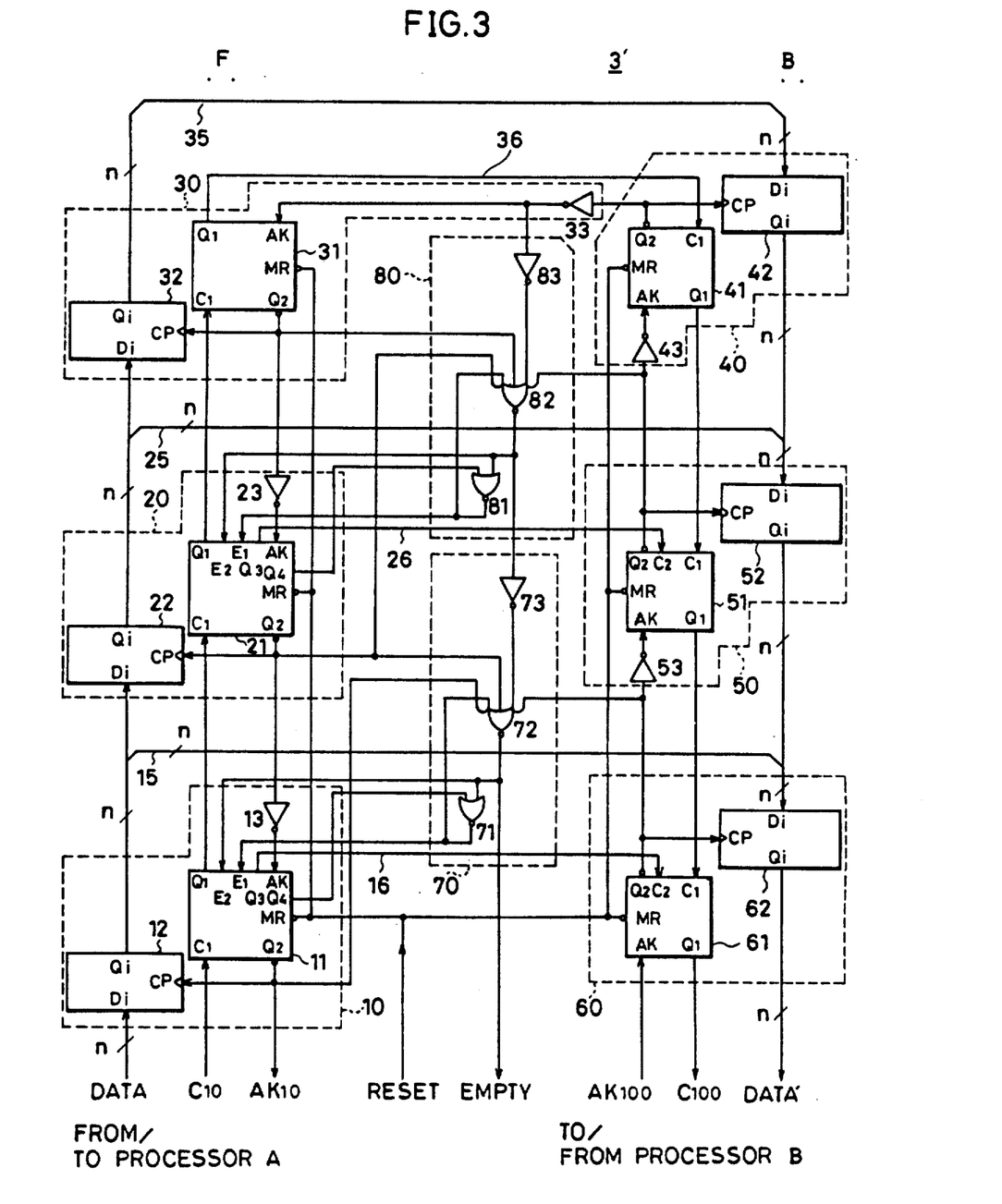
FIG. 3 is a diagram showing a schematic configuration of the data storage device shown in FIG. 2.

FIG. 3 shows a specific configuration of the data storage device shown in FIG. 2. Referring to FIG. 3, a data transfer device 10 includes a data transfer control device 11 and a data latch 12. A data transfer device 20 includes a data transfer control device 21 and a data latch 22. A data transfer device 30 includes a data transfer control device, 31 and a data latch 32. A data transfer device 40 includes a data transfer control device 41 and a data latch 42. A data transfer device 50 includes a data transfer control device 51 and a data latch 52. A data transfer device 60 includes a data transfer control device 61 and a data latch 62.

The data latches 12, 22, 32, 42, 52 and 62 have the same configuration, each of which has an input Di receiving data of n-bit width in parallel, an output Qi outputting data of n-bit width in parallel, and a clock input CP receiving a timing signal of data transfer. As each of the data latches, a data latch of an edge trigger type is used for latching applied data as input data and outputting the same when a signal applied to the clock input CP rises to the "H" level while continuing to hold the data even if the signal applied to the clock input CP falls to the "L" level.

The data transfer devices 11 and 21 in the first and second stages of a going path F have the same configuration, which has a transmission signal input C1, transmission acknowledging signal inputs AK, E1 and E2, transmission signal outputs Q1, Q3 and Q4, a transmission acknowledging signal output Q2 and a reset input MR. A signal AK10 for acknowledging transmission to a processor A (on a data transmitting side) is outputted from the output Q2 of the data transfer control device 11.

Figure 4:
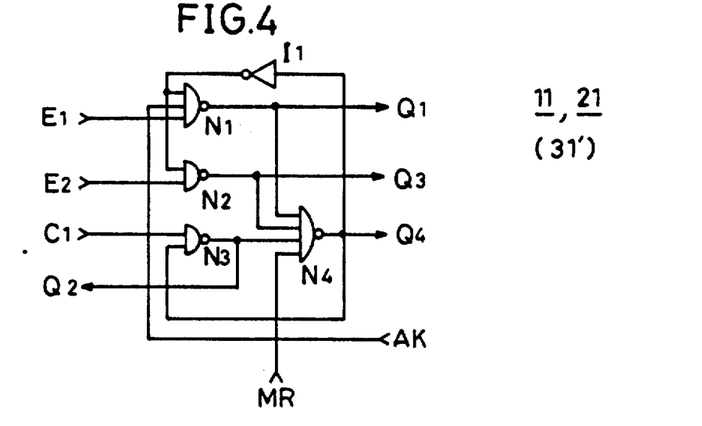
FIG. 4 is a diagram showing at a logic level a specific configuration of each of data transfer control devices provided in first and second stages from an input portion shown in FIG. 2.

FIG. 4 shows at a logic level a configuration of each of the data transfer control devices 11 and 21. In the following description, signals applied to respective signal input/output terminals and each terminal are denoted by the same reference.

Referring to FIG. 4, each of the data transfer control devices 11 and 21 includes a single inverter I1 and four NAND gates N1 to N4. The inverter I1 receives a transmission signal Q4. The 3-input NAND gate N1 receives transmission acknowledging signals E1 and AK and an output of the inverter I1, to output a transmission signal Q1. The 2-input NAND gate 2 receives the output of the inverter I1 and a transmission acknowledging signal E2, to output a transmission signal Q3. The 2-input NAND gate N3 receives transmission signals C1 and Q4, to output a transmission acknowledging signal Q2. The 4-input NAND gate N4 receives the master reset signal MR, the transmission acknowledging signal Q2 and the transmission signals Q1 and Q3, to output the transmission signal Q4. The transmission signals C1, Q1, Q3 and Q4 become the "L" level when data to be transmitted exists. The transmission acknowledging signal AK becomes the "H" level to indicate data transmission, while the transmission acknowledging signal Q2 becomes the "L" level to indicate a transmission acknowledgement. The bypassing acknowledging signals E1 and E2 indicate whether or not a bypassing path is rendered active. When the signal E1 is at the "L" level and the signal E2 is at the "H" level, the bypassing path is selected. The master reset signal MR becomes the "L" level at the time of resetting.

Figure 5:
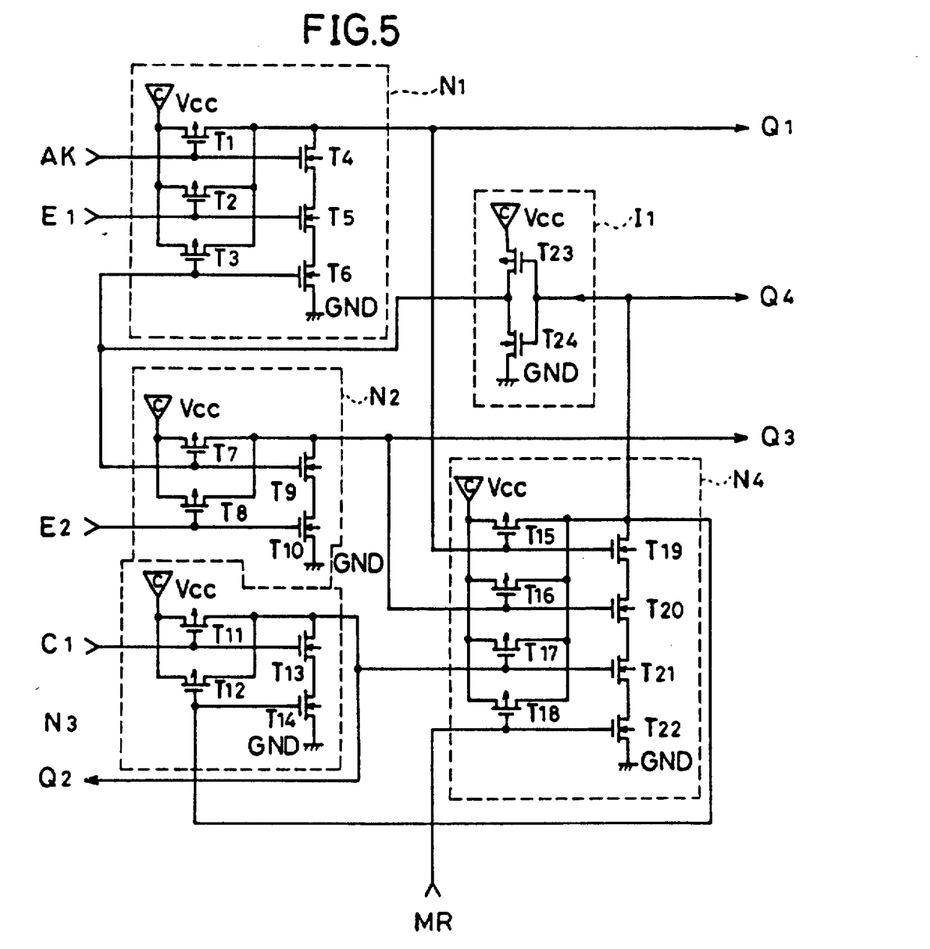
FIG. 5 is a circuit diagram showing a more detailed configuration of the data transfer control device shown in FIG. 4.

FIG. 5 is a circuit diagram obtained by developing at a transistor level the circuit at a logic level shown in FIG. 4.

Referring now to FIG. 5, an inverter I1 includes a p channel MOS transistor T23 and an n channel MOS transistor T24.

A NAND gate N1 includes three p channel MOS transistors T1, T2 and T3 connected in parallel between a power supply Vcc and an output node, and three n channel MOS transistors T4, T5 and T6 connected in series between the output node and the ground GND. A signal AK is applied to respective gates of the transistors T1 and T4. A signal E1 is applied to respective gates of the transistors T2 and T5. An output of the inverter I1 is applied to respective gates of the transistors T3 and T6.

A NAND gate N2 includes two p channel MOS transistors T7 and T8 connected in parallel between the power supply Vcc and an output node, and n channel MOS transistors T9 and T10 connected in series between the output node and the ground GND. The output of the inverter I1 is applied to respective gates of the transistors T7 and T9. A signal E2 is applied to respective gates of the transistors T8 and T10.

A NAND gate N3 includes two p channel MOS transistors T11 and T12 connected in parallel between the power supply Vcc and an output node, and two n channel MOS transistors T13 and T14 connected in series between the output node and the ground GND. A signal C1 is applied to respective gates of the transistors T11 and T13. A signal Q4 is applied to respective gates of the transistors T12 and T14.

A NAND gate N4 includes four p channel MOS transistors T15, T16, T17 and T18 connected in parallel between the power supply Vcc and the output node, four n channel MOS transistors T19, T20, T21 and T22 connected in series between the output node and the ground GND.

Returning to FIG. 3, the data transfer control devices 31 and 41 in third stages of the going path F and the returning path B have the same configuration, each of which has a transmission signal input C1, a transmission signal output Q1, a transmission acknowledging signal input AK, a transmission acknowledging signal output Q2 and a reset input MR.

Figure 6:
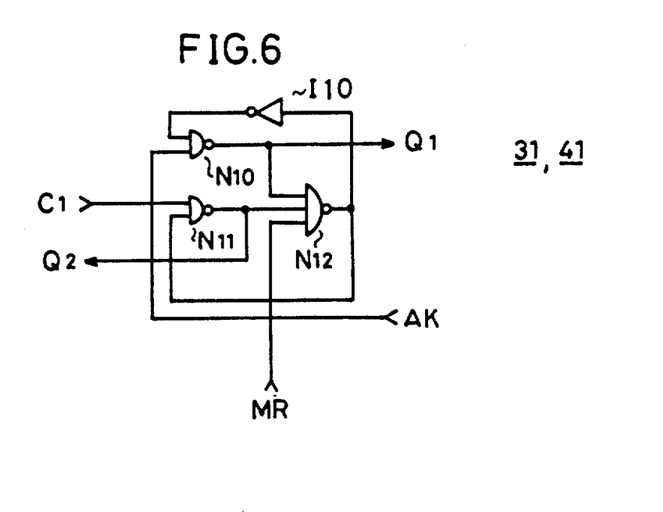
FIG. 6 is a diagram showing at a logic level a specific configuration of each of data transfer control devices provided in third stages of a going path and a returning path shown in FIG. 3.

FIG. 6 is a circuit diagram showing at a logic level each of the data transfer control devices 31 and 41. Referring now to FIG. 6, each of the data transfer control devices in the final stages of the going path F and the returning path B includes a 3-input NAND gate N12 receiving a master reset signal MR, a transmission acknowledging output signal Q2 and a transmission output signal Q1, an inverter I10 receiving an output of the NAND gate N12, a-2-input NAND gate N10 receiving an output of the inverter I10 and a transmission acknowledging input signal AK to output the transmission output signal Q1, and a 2-input NAND gate N11 receiving a transmission signal C1 and the output of the NAND gate N12 to output the transmission acknowledging signal Q2.

At the time of resetting, the master reset signal MR becomes the "L" level, the transmission signal output Q1 becomes the "H" level, and the transmission acknowledging signal output Q2 enters the "L" level.

Figure 7:
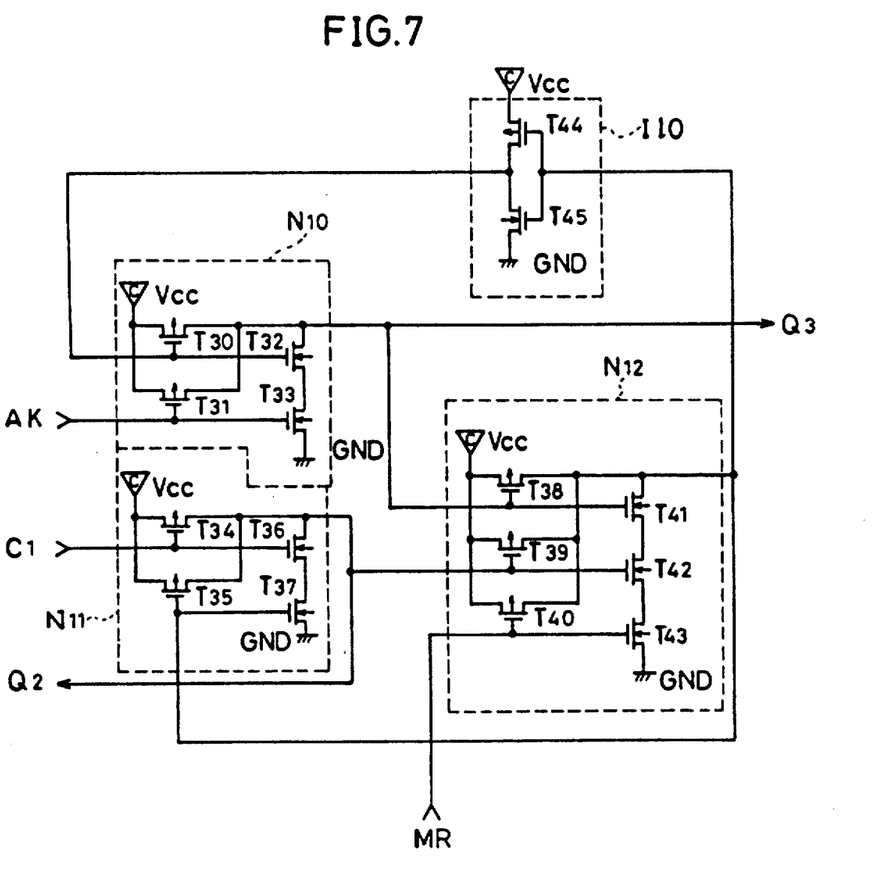
FIG. 7 is a circuit diagram showing at a transistor level the data transfer control device shown in FIG. 6.

FIG. 7 is a circuit diagram showing at a transistor level the data transfer control device shown in FIG. 6. Referring to FIG. 7, an inverter I10 includes a p channel MOS transistor T44 and an n channel MOS transistor T45 in complementary connection.

An NAND gate N10 includes two p channel MOS transistors T30 and T31 connected in parallel between a power supply Vcc and an output node, and two n channel MOS transistors T32 and T33 connected in series between the output node and the ground GND. The transistors T30 and T32 have their gates receiving an output of the inverter I10. The transistors T31 and T33 have their gates receiving a signal AK.

The NAND gate N11 includes two p channel MOS transistors T34 and T35 connected in parallel between the power supply Vcc and the output node, and two n channel MOS transistors T36 and T37 connected in series between the output node and the ground GND. A signal C1 is applied to respective gates of the transistors T34 and T36. An output of a NAND gate N12 is applied to respective gates of the transistors T35 and T37.

The NAND gate N12 includes three p channel MOS transistors T38 and T39 and T40 connected in parallel between the power supply Vcc and an output node, and three n channel MOS transistors T41, T42 and T43 connected in series between the output node and the ground GND. The transistors T38 and T41 have their gates receiving a signal Q2. The transistors T39 and T42 have their gates receiving a signal Q3. The transistors T40 and T43 have their gates receiving a signal MR.

Figure 8:
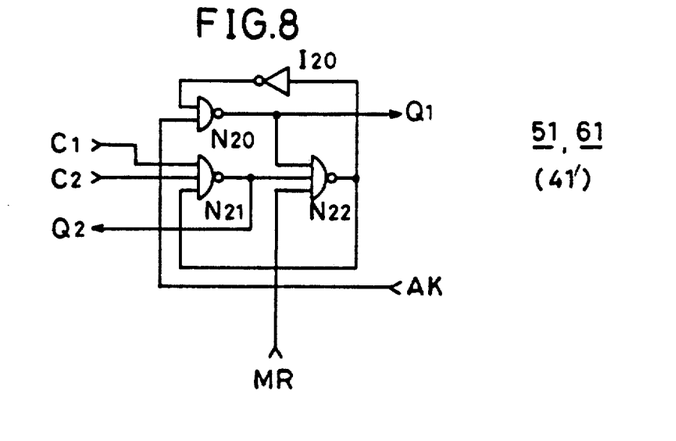
FIG. 8 is a diagram showing at a logic level a configuration of each of data transfer control devices in first to third stages of a returning path shown in FIG. 10.
Figure 9:
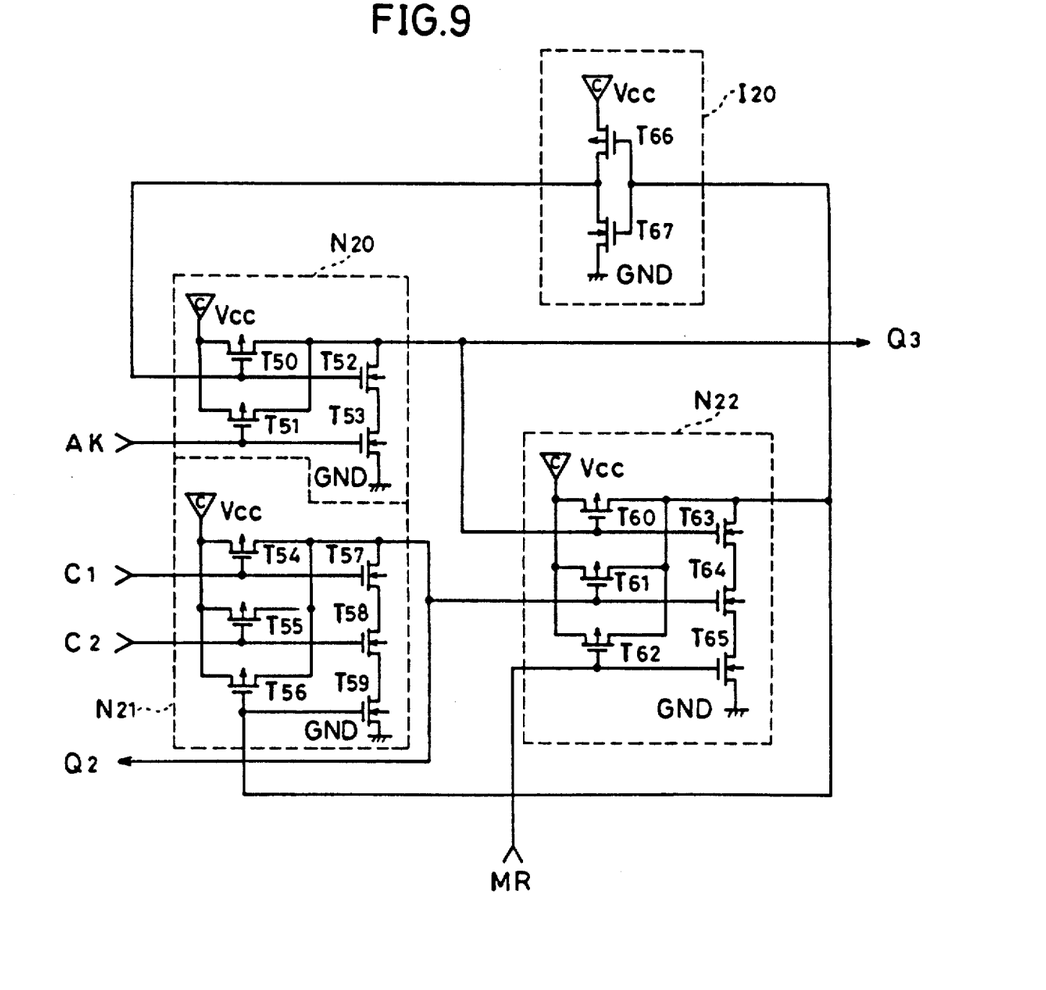
FIG. 9 is a circuit diagram showing at a transistor level the data transfer control device shown in FIG. 8.

Returning to FIG. 3, the data transfer control devices 51 and 61 in first and second stages of the returning path B have the same configuration, each of which has transmission signal inputs C1 and C2, a transmission acknowledging signal input AK, a transmission signal output Q1, a transmission acknowledging signal output Q2 and a reset input MR. FIGS. 8 and 9 show a specific configuration of each of the data transfer control devices 51 and 61.

Referring to FIG. 8, each of the data transfer control devices 51 and 61 includes a 3-input NAND gate N22 receiving a reset signal MR, a transmission acknowledging signal Q2 and a transmission signal Q1, an inverter I20 receiving an output of the NAND gate N22, a 2-input NAND gate N20 receiving an output of the inverter I20 and a transmission acknowledging signal AK to output the transmission signal Q1, and a NAND gate N21 receiving transmission signals C1 and C2 and an output of the NAND gate N22 to output the transmission acknowledging signal Q2.

Referring to FIG. 9, an inverter I20, includes a p channel MOS transistor T66 and an n channel MOS transistor T67. A NAND gate N20 includes two p channel MOS transistors T50 and T51 connected in parallel between a power supply Vcc and an output node, and two n channel MOS transistors T52 and T53 connected in series between the output node and the ground GND. An output of the inverter I20 is applied to respective gates of the transistors T50 and T52. A signal AK is applied to respective gates of the transistors T51 and T52.

A NAND gate N21 includes three p channel MOS transistors T54, T55 and T56 connected in parallel with each other between the power supply Vcc and an output node, and three n channel MOS transistors T57, T58 and T59 connected in series between the output node and the ground GND. A transmission signal C1 is applied to respective gates of the transistors T54 and T57. A transmission signal C2 is applied to respective gates of the transistors T55 and T58. An output of a NAND gate N22 is applied to respective gates of the transistors T56 and T59.

The NAND gate N22 includes three p channel MOS transistors T60, T61 and T62 connected in parallel between the power supply Vcc and an output node, and three n channel MOS transistors T63, T64 and T65 connected in series between the output node and the ground GND. A signal Q3 is applied to respective gates of the transistors T60 and T63. The signal Q2 is applied to respective gates of the transistors T61 and T64. A signal MR is applied to respective gates of the transistors T62 and T65.

Returning to FIG. 3, the transmission acknowledging signals AK to the data transfer control devices 11, 21, 31, 41 and 51 are respectively provided with inverters 13, 23, 33, 43 and 53.

A valid data detector 80 for rendering bypassing paths 25 and 26 active includes an inverter 83, a 5-input NOR gate 82 and a 2-input NOR gate 81. The inverter 83 receives the transmission acknowledging signal output Q2 of the data transfer control device 41 through the inverter 33. The NOR gate 82 receives the transmission acknowledging signal output Q2 of the data transfer control device 51, an output of the inverter 83, the transmission acknowledging signal output Q2 of the data transfer control device 31, the transmission acknowledging signal output Q2 of the data transfer control device 21, an output of the NOR gate 81 and an output of the inverter 83. The NOR gate 81 receives an output of the NOR gate 82 and the transmission signal output Q4 of the data transfer control device 21. An output of the NOR gate 81 is applied to the bypassing acknowledging signal input E1 of the data transfer control device 21.

A valid data detector 70 includes an inverter 73, a 5-input NOR gate 72, and a 2-input NOR gate 71. The inverter 73 receives an output of the NOR gate 82. The NOR gate 72 receives the transmission acknowledging signal output Q2 of the data transfer control device 61, an output of the inverter 73, the transmission acknowledging signal output Q2 of the data transfer control device 21, the transmission acknowledging signal output Q2 (i.e., AK10) of the data transfer control device 11, and an output of the NOR gate 71, to output a signal EMPTY indicating whether or not valid data exists in the data storage device 3'. The NOR gate 71 receives an output of the NOR gate 72 and the transmission signal output Q4 of the data transfer control device 11. The output of the NOR gate 71 is applied to the bypassing acknowledging signal input E1 of the data transfer control device 11.

In a continuous path from an input portion of the going path F to an output portion of the returning path B, a transmission signal output Q1 of a data transfer control device is connected to a transmission signal input C1 of a data transfer control device in the next stage. In addition, a transmission acknowledging signal output Q2 of a given data transfer control device is connected to a transmission signal input AK of a data transfer control device in the preceding stage thorough an inverter.

In the data transfer control devices in the same stage of the going path F and the returning path B, the transmission signal output Q3 of the data transfer control device in the going path F is connected to the transmission signal input C2 of the data transfer control device in the returning path B.

The above described connecting manner provides handshaking transfer control for data transfer between any data transfer devices. Referring now to FIGS. 3 to 9, the operation will be describe in detail.

In an initial state, the reset signal MR from the processor A becomes active, for example, the "L" level and each of the data transfer control devices 11, 21, 31, 41, 51 and 61 is reset. In this initial state, in all the data transfer control devices, the transmission signal output Q1 becomes the "H" level and the transmission acknowledging signal output Q2 becomes the "L" level. Thus, the data transmission acknowledging signal AK 10 applied to the processor A (on a transmission side) becomes the "L" level indicating acknowledgement of data transmission. In addition, the signal EMPTY is at the "H" level.

In this state, the transmission signal C10 and the data DATA are first applied to the data latch 12 and the data transfer control device 11 from the processor A. Significant data has not existed yet in the data transfer device 60. Thus, in the data transfer control device 61 the transmission signal inputs C1 and C2 are at the "H" level, and the transmission acknowledging signal output Q2 remains at the "L" level. In addition, at the time of resetting, the transmission signal outputs Q4 of the data transfer control devices 11 and 21 are at "H" level. Similarly, since the transmission acknowledging signal output Q2 of each of the data transfer control devices 21, 31 and 41 which is an input of the NOR gate 82 is at the "L" level and the output Q4 of the data transfer control device 21 obtained through the NOR gate 81 is at the "L" level, the output of the NOR gate 82 is at the "L" level. Thus, the output of the inverter 73 is at "H" level. In the same manner, the output of the NOR gate 72 is at the "H" level. Further, the output of the NOR gate 71 becomes the "L" level, so that the output of the NOR gate 72 becomes the "H" level.

Then, when the "L" level transmission signal C10, together with data to be transmitted DATA, is applied to the input C1 of the data transfer control device 11, the output Q4 of the device 11 becomes the "L" level while the output of the NOR gate 72 remains at the "H" level, so that the output of the NOR gate 71 remains at the "L" level. Consequently, as obvious from FIG. 4, the bypassing transmission signal output Q3 of the device 11 becomes the "L" level, while the transmission signal output Q1 of the device 11 remains at the "H" level. This means that the bypassing paths 15 and 16 are selected. Thus, in the data transfer control device 11, the transmission acknowledging signal output Q2 becomes the "H" level in response to the "L" level of the transmission signal input C1, so that the transmitted data DATA applied to the data latch 12 is transferred to the data transfer device 60 to be latched therein through the bypassing path 15 in response to the fall of the output Q2 of the device 11.

In the data transfer control device 61 in the first stage of the returning path B, the transmission signal input C1 becomes the "H" level and the transmission signal input C2 becomes the "L" level. Thus, as obvious from FIG. 8, if the transmission acknowledging signal AK100 is at the "H" level indicating permission of data transmission, the transmission signal output Q1 becomes the "L" level in response to the "L" level of the transmission signal input C2, to be outputted as a transmission signal C100. Consequently, if and when the transmission acknowledging signal AK100 is at the "H" level indicating permission of data transmission, the data to be transmitted and the transmission signal transferred through the bypassing paths 15 and 16 are outputted from the data transfer device 60 as output data DATA, and a transmission signal C100. On this occasion, the transmission acknowledging signal output Q2 of the device 61 is changed from the "H" level to the "L" level in response to the change of the input C2 from the "L" level to the "H" level.

When the transmission acknowledging signal AK100 is at the "L" level indicating inhibition of data transmission, even if the transmission signal input C2 of the data transfer control device 61 becomes the "L" level, the transmission signal output Q1 thereof remains at the "H" level. Thus, the transmission acknowledging signal output Q2 of the data transfer control device 61 remains at the "H" level even if the transmission signal input C2 thereof is changed from the "L" level to the "H" level, so that the data transferred through the bypassing path 15 remains latched in the data latch 62. Then, a case is considered in which in this state, a second transmission signal C10 and second data DATA are newly applied to the data transfer device 10. In this case, the transmission acknowledging signal output Q2 of the data transfer control device 61 is at the "H" level. Thus, the output of the NOR gate 72 becomes the "L" level, and the bypassing acknowledging signal E2 is changed from the "H" level to the "L" level. Thus, the bypassing transmission signal output Q3 of the transfer control device 11 remains at the "H" level. Consequently, the bypassing paths 15 and 16 are rendered inactive. On the other hand, when the transmission signal C10 is applied, the transmission signal input C1 of the data transfer control device 11 becomes the "L" level and the transmission signal output Q4 thereof becomes the "L" level. Consequently, the output of the NOR gate 71 becomes the "H" level. As a result, the transmission signal output Q1 of the data transfer control device 11 becomes the "L" level (the signal AK is at the "H" level) in response to the transmission signal C10.

In the data transfer control devices 21 and 51 in the second stages, valid data has not existed yet. Thus, the output of the NOR gate 81 is at the "L" level, the output of the NOR gate 82 remains at the "H" level, and the bypassing acknowledging signals E1 and E2 are respectively at the "L" and "H" levels, so that the bypassing paths 25 and 26 are rendered active. Thus, the transmission acknowledging signal output Q2 of the device 21 becomes the "H" level and the transmission signal output Q3 thereof becomes the "L" level in response to the transmission signal applied to the transmission signal input C1 of the data transfer control device 21. Consequently, the bypassing paths 25 and 26 are rendered active, data latched in the data latch 22 is transferred to the data latch 52 in response to the states of the transmission signal input C1 and the acknowledging signal output Q1, and the transmission signal Q3 is applied to the transmission signal input C1 of the data transfer control device 51. On this occasion, if the transmission acknowledging signal AK100 remains at the "L" level of the transfer inhibiting state, the acknowledging signal input AK of the device 51 remains at the "L" level. Thus, the transfer acknowledging signal output Q2 of the device 51 remains at the "H" level, and the data latch 52 continues to latch data. This transfer acknowledging signal output Q2 also indicates that significant data exists in this data transfer device 50.

Then, a case is considered in which third data to be transmitted DATA and a third transmission signal C10 are applied. In this case, the bypassing paths 15 and 16 are brought to the data transfer inhibited state by the NOR gates 71 and 72. In addition, the bypassing paths 25 and 26 are also brought to the data transfer inhibited state by the NOR gates 81 and 82. The data transfer control device 31 brings the transfer acknowledging signal output Q2 and the transmission signal output Q1 to the "H" and "L" levels, respectively, in response to the "L" level of the transmission signal input C1. Consequently, the data latch 32 accepts the applied transmitted data DATA, to transfer the same to the data latch 42 through the data bus 35. The data transfer control device 41 brings the transfer acknowledging signal output Q2 to the "H" level in response to the "L" level of the transfer signal input C1 thereof. The data latch 42 latches the applied data in response to this "H" level transfer acknowledging signal output Q2. On this occasion, the transfer acknowledging signal input AK of the data transfer control device 41 is at the "L" level, and the transmission signal output Q1 and the transfer acknowledging signal output Q2 thereof remain at the "H" level. However, in the transfer control device 31, even if the transfer acknowledging input signal AK thereof remains at the "L" level, the transmission signal output Q1 is autonomously returned to the "H" level and the transfer acknowledging signal output Q2 is returned to the "L" level. Thus, the transfer acknowledging signal outputs Q2 of the data transfer control devices 11 and 21 are at the "L" level, to allow reception of the subsequent data.

Thereafter, when the transmission acknowledging signal AK100 becomes the "H" level indicating the acknowledging state, the transmission signal output Q1 of the data transfer control device 61 first becomes the "L" level, to be outputted as an active transmission signal C100. In addition, the transfer acknowledging signal output Q2 of the data transfer control device 61 becomes the "L" level, so that data latched in the data latch 62 is outputted as data to be transmitted DATA'. Then, the data transfer control device 51 lowers the transmission signal output Q1 thereof to the "L" level in response to the "H" level of the transfer acknowledging signal input AK thereof to inform the transfer control device 61 of data transfer, as well as lowers the transfer acknowledging signal output Q2 thereof to the "L" level to output data latched in the data latch 52. The data transfer control device 61 raises the transfer acknowledging signal output Q2 thereof to the "H" level in response to the transmission signal Q1 from the device 51 to inform the transfer control device 51 of initiation of reception, and latches in the data latch 61 data transferred from the data latch 51. Similar handshaking transfer control is performed between the transfer control devices 41 and 51, so that data transfer is made from the data latch 42 to the data latch 52. In the above described manner, the data to be transmitted DATA' is outputted from the data transfer device 60 in the returning path B in the order in which the data to be transmitted are applied to the data transfer device 11 in the going path F.

Meanwhile, the output signal EMPTY of the NOR gate 72 is a signal indicating the state in which data can be written into the storage device. Only when the signal EMPTY indicates the write enable state and the transmission acknowledging signal AK10 indicates the permission of data transmission, may data be written into this storage device.

Besides, in the above described embodiment, three types of data transfer control devices are employed as a data transfer control device. However, if this data storage device is implemented as an integrated circuit device, it is desirable to employ transfer control devices having the same circuit configuration. The reason is that in general, the same pattern can be repeatedly used in the design of an LSI layout pattern, so that the designing time is reduced and the element configuration is simplified.

Figure 10:
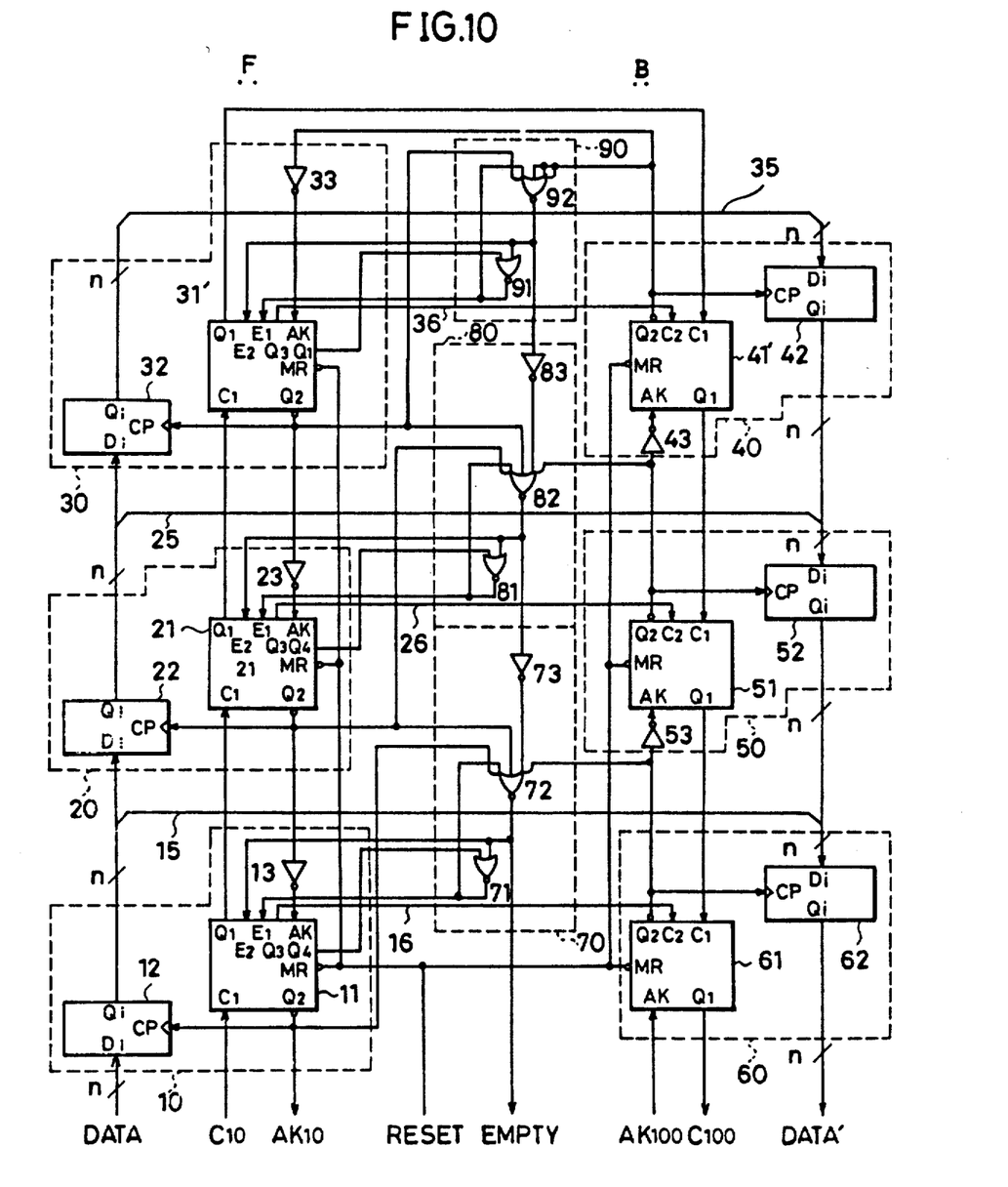
FIG. 10 is a diagram showing a configuration of a data storage device according to another embodiment of the present invention.

FIG. 10 shows a schematic configuration of a data storage device using data transfer control devices having the same circuit configuration in a going path and a returning path.

Referring to FIG. 10, data transfer control devices 11, 21 and 31' in the going path F respectively have the circuit configuration shown in FIG. 4. Data transfer control devices 41', 51 and 61 in the returning path B respectively have the circuit configuration shown in FIG. 8.

In order to make possible such circuit configuration, there is provided a valid data detector 90 for detecting the presence or absence of valid data in a third stage data transfer device 40 in the returning path B.

The valid data detector 90 has a 5-input NOR gate 92 and a 2-input NOR gate 91. The 2-input NOR gate 91 receives a transmission signal output Q4 of the data transfer control device 31' and an output of a NOR gate 92. An output of the NOR gate 91 is applied to a transmission acknowledging signal input E1 in the transfer control device 31'. The NOR gate 92 receives a transfer acknowledging signal output Q2 of the transfer control device 41', the output of the NOR gate 91 and a transfer acknowledging signal output Q2 of the transfer control device 31'. The output of the NOR gate 92 is applied to a transmission acknowledging signal input E2 of the transfer control device 31'. The 5-input NOR gate 92 receives only three different signals, and functions as a 3-input NOR gate. In order to form the valid data detector 90 in a circuit configuration which is as identical to other valid data detectors 70 and 80 as possible, the 3-input NOR gate is replaced with a 5-input NOR gate. The operation will be described.

An operation of transferring data to data transfer devices 60 and 50 in the first and second stages is the same as that in the embodiment shown in FIG. 3. When an active ("L" level) transmission signal is applied to a transmission signal input C1 of the data transfer control device 31' in the third stage of the going path F, the valid data detector 90 detects the presence or absence of valid data in the data transfer device 40. Since no valid data exists in the data transfer device 40, the output of the NOR gate 91 becomes the "L" level and the output of the NOR gate 92 becomes the "H" level. Thus, the data transfer control device 31' outputs an "L" level signal from the transmission signal output Q3 thereof in response to the "L" level of the transmission signal input C1 thereof. Consequently, a transmission signal input C2 of the data transfer control device 41' becomes the "L" level.

The data transfer control device 41' raises the transfer acknowledging signal output Q2 thereof to the "H" level in response to the "L" level of the transmission signal input C2 thereof. In response thereto, a data latch 42 latches data transferred from a data latch 32. On this occasion, a transfer acknowledging signal input AK of the data transfer control device 31' becomes the "L" level. On the other hand, the transfer acknowledging signal output Q2 thereof once becomes the "H" level and then, is autonomously returned to the "L" level, to allow reception of the subsequent data to the data transfer devices 11 and 21. When a transmission acknowledging signal AK100 is applied to a transmission acknowledging signal input AK of the data transfer control device 61, data in the data transfer devices 40, 50 and 60 in the returning path B are respectively transferred to the preceding transfer devices according to handshaking transfer control, as in the embodiment shown in FIG. 3.

Although in the above described embodiment, description was made on a case in which the number of storage stages in the data storage device is 3, the number of storage stages is determined in accordance with the scale of a system to which this storage device is applied, so as to prevent overflow of data.

As described in the foregoing, in the data storage device according to the present invention, a data transmission path has a folded configuration with a going path and a returning path respectively having the same number of storage stages, in which a bypassing path is provided between a data transfer device in the going path and a corresponding data transfer device in the returning path, and a valid data detector for detecting the presence or absence of valid data in the data transfer device in the returning path to determine whether or not the bypassing path is used as the data transfer path is provided corresponding to each storage stage (or bypassing path). Thus, if and when data stays in the output portion of the storage device, data applied to the input portion is transferred to the data transfer device in the subsequent stages for buffering. On the other hand, when data does not stay therein, transmitted data as inputted is transferred through the bypassing path at the least transfer time. Consequently, a data storage device having the minimum delay elastic buffering function is obtained in which data transfer between asynchronous systems is made at the delay time most suitable for the data transfer situation. In particular, since a data transfer control device is integrated in a hardware manner, a compact MIDES (minimum delay elastic storage) capable of performing data control and data processing at high speed is obtained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A first-in first-out type data storage device for storing input data applied to an input portion thereof from an exterior source in the data storage device in response to a write-in control signal and outputting the stored data from an output portion thereof in response to a read-out control signal, comprising:

a data transmission path provided between said input portion and said output portion and having a folded configuration with a going path and a returning path, wherein said going path is connected to said input portion, said returning path is connected to said output portion, and said going and returning paths provide a folded transmission path of a continuous data transmission path;

data storage means provided on said going path and said returning path for storing applied data, wherein said going path and said returning path respectively comprise the same number of said data storage means connected in a cascade manner;

by passing means for linking said data storage means in said going path and said data storage means in said returning path in one-to-one correspondence to each other;

said bypassing means coupling an output portion of said data storage means in said going path to an input portion of the corresponding data storage means in said returning path;

valid data detecting means provided corresponding to each of said bypassing means and activated in response to application of the write-in control signal to said data storage means connected to the corresponding bypassing means for detecting the presence and absence of valid data in the corresponding data storage means in said returning path; and transfer control means provided corresponding to each of said bypassing means for activating the corresponding bypassing means in response to a valid data absence detecting signal from the corresponding valid data detecting means, and transferring the input data and the write-in control signal to the corresponding data storage means in said going path through the activated bypassing means for storing the same therein, said transfer control means transferring the input data and write-in control signal to said data storage means in the next stage through said going path in response to a valid data presence detecting signal from the corresponding valid data detecting means.

2. The data storage device according to claim 1, wherein each of said data storage means in said returning path comprises means for applying a data transfer inhibiting signal to said data storage means in a subsequent stage from said output portion when said data storage means stores valid data and indicating an existence of data in said data storage means.

3. The data storage device according to claim 1, wherein each of said data storage means in said going path have the same configuration except for said data storage means in a final stage connected to a folded portion of said folded transmission path, and said data storage means other than said data storage means in said final stage are provided with said bypassing means and said valid data detecting means, each of said data storage means other than said data storage means in said final stage of said going path comprising:

data transmission signal receiving means for receiving a data transmission signal corresponding to the write-in control signal;

activation signal generating means responsive to said data transmission signal corresponding to the write-in control signal for generating an activation signal to corresponding valid data detecting means; and data transfer control means responsive to an output of the corresponding valid data detecting means activated by said activation signal and a data transfer acknowledging signal from a subsequent data transfer control means in the next stage of said going path for transferring said data transmission signal corresponding to the write-in control signal to said subsequent data transfer control means in the next stage of said going path or the corresponding bypassing means.

4. The data storage device according to claim 3, wherein each of said data storage means in said returning path have the same configuration except for said data storage means in the final stage connected to said folded portion, each of said data storage means in said returning path other than said data storage means in the final stage comprising:

data transmission request signal receiving means for receiving a data transmission request signal corresponding to the read-out control signal;

data transmission signal outputting means for outputting said data transmission signal corresponding to the write-in control signal; and writing means responsive to said data transmission signal corresponding to said write-in control signal from the corresponding bypassing means, said data transmission signal from said data storage means in the next stage of said returning path and said data transmission request signal for applying said transmission request signal to said data storage means in the next stage of said returning path and storing the applied data;

said writing means comprising means responsive to said transmission request signal in an active state for outputting said stored data and activating said data transmission signal outputting means.

5. The data storage device according to claim 4, wherein said data storage means in the final stages of said returning path and said going path connected to said folded portion have the same configuration, said data storage means in the final stages of said returning path and said going path comprising:

final stage data transmission signal receiving means for receiving said data transmission signal corresponding to the write-in control signal;

final stage data transmission request signal receiving means for receiving said data transmission request signal corresponding to the read-out control signal;

final stage data transmission request outputting means responsive to said received data transmission request signal for outputting said data transmission request signal to one of said data storage means in a succeeding state with respect to the output portion; and final stage data storing means responsive to said data transmission signal from said final stage data transmission signal receiving means and said data transmission request signal input to said final stage data transmission request signal receiving means for storing applied data;

said final stage data storing means comprising means responsive to said data transmission request signal for reading out the data as written and outputting said data transmission signal to a preceding data storage means in the preceding stage with respect to the output portion.

6. The data storage device according to claim 1, wherein said valid data detecting means comprises:

detecting means for detecting the presence and absence of valid data in said data storage means in said returning path closer to the output portion than the corresponding bypassing means; and path setting means responsive to san output of said valid data detecting means for setting a path through which the write-in control signal is transferred.

7. The data storage device according to claim 1, wherein each of said data storage means in said going path have the same configuration;

said bypassing means and said valid data detecting means are provided corresponding to each of said data storage means; and each of said data storage means in said going path further comprising:

data transmission signal receiving means for receiving a data transmission signal corresponding to the write-in control signal;

activation signal applying means responsive to said data transmission signal for applying an activation signal to the corresponding valid data detecting means; and data transfer control means responsive to an output of the corresponding valid data detecting means activated by said activation signal and a data transfer acknowledging signal from a subsequent data transfer control means in the next stage of said going path for transferring said data transmission signal corresponding to the write-in control signal to said subsequent data transfer control means in the next stage of said going path or the corresponding bypassing means.

8. The data storage device according to claim 7, wherein each of said data storage means in said returning path have the same configuration, and said data storage means in said returning path further comprising:
- data request signal receiving means for receiving a data transmission request signal corresponding to the read-out control signal;
- data transmission signal outputting means for outputting said data transmission signal corresponding to the write-in control signal; and
- writing means responsive to said data transmission signal corresponding to the write-in control signal from the corresponding bypassing means, said data transmission signal from said subsequent data storage means in the next stage of said returning path and said data transmission request signal for applying said transmission request signal to said subsequent data storage means in the next state of said returning path and storing the applied data;
- said writing means comprising means responsive to said data transmission request signal in an active state for outputting said stored data and activating said data transmission signal outputting means.

9. The data storage device according to claim 1, wherein
each of said data storage means comprises NAND gates, which provide handshaking transfer control for data transfer between the data storage means connected to each other.

10. The data storage device according to claim 1, wherein
said valid data detecting means comprises a NOR gate.

11. A method for storing input data applied to an input portion of a first-in first-out type data storage device from an exterior source to the data source device in response to a write-in control signal and outputting the stored data from an output portion of the data storage device in response to a read-out control signal, comprising the steps of:
(a) storing applied data in data storage means of a going path and a returning path of a data transmission path provided between the input portion and the output portion of the data storage device, said data transmission path having a folded configuration with said going path connected to the input portion and said returning path connected to the output portion which provide a folded transmission path of a continuous data transmission path;
(b) linking the data storage in said going path and said returning path at said step (a) in one-to-one correspondence to each other by coupling an output portion of said data storage means in said going path to an input portion of the corresponding data storage means in said returning path;
(c) detecting the presence and absence of valid data in each of said data storage means of said returning path corresponding to said data storage means linked thereto at said step (b) in response to application of the write-control signal;
(d) activating the corresponding going path an returning path linked at said step (b) in response to a valid data absence detecting signal from the corresponding detection at said step (c);
(e) transferring the input data and the write-in control signal to the corresponding data storage means in said returning path from the corresponding data storage means in said going path linked at said step (b) for storing the same therein; and
(f) transferring the input data and the write-in control signal to said data storage means in the next stage through said going path in response to a valid data presence detecting signal from the corresponding detection at said step (c).

12. The method according to claim 1, further comprising the step of applying a data transfer inhibiting signal to said data storage means in a subsequent stage from the output portion when said data storage stores valid data for indicating an existence of valid data in each of said data storage means.

13. The method according to claim 1, wherein each of said data storage means in said going path have the same configuration except for said data storage means in a final stage connected to a folded portion of said folded transmission path, each of said data storage means other than said data storage means in said final stage of said going path storing-applied data, comprising the steps of:
- receiving a data transmission signal corresponding to the write-in control signal;
- generating an activation signal to the corresponding detection at said step (c) responsive to said data transmission signal corresponding to the write-in control signal; and
- transferring said data transmission signal corresponding to the write-in control signal to a subsequent data transfer in a next stage of said going path or the corresponding paths linked at said step (b) responsive to an output of the corresponding detecting at said step (c) activated by said activation signal and a data transfer acknowledging signal from a subsequent data transfer in a next stage of said going path.

14. The method according to claim 13, wherein each of said data storage means in said returning path other than said data storage means in the final stage comprising the steps of:
- receiving a data transmission request signal corresponding to the read-out control signal;
- outputting said data transmission signal corresponding to the read-out control signal; and
- applying said data transmission request signal to said data storage means in the next stage of said returning path and storing the applied data responsive to said data transmission signal corresponding to the write-in control signal from the corresponding linked paths, said data transmission signal from said data storage means in the next stage of said returning path and said data transmission request signal by outputting said stored data and activating said step of outputting said data transmission signal responsive to said transmission request signal in an active state.

15. The method according to claim 14, wherein storing data in each of said data storage means in the final stages of said returning path and said going path comprises the steps of:
- receiving said data transmission signal corresponding to the write-in control signal;
- receiving said data transmission signal corresponding to the read-out control signal;
- outputting said data transmission request signal to one of said data storage means in a succeeding stage with respect to the output portion responsive to said received data transmission request signal; and storing applied data responsive to said data transmission signal and said data transmission request signal by reading out the data as written and outputting said data transmission signal to a preceding data storage means in the preceding stage with respect to the output portion responsive to said data transmission request signal.

16. The method according to claim 11, wherein said step (c) further comprises the steps of:
  detecting the presence and absence of valid data in said data storage means in said returning path closer to the output portion than the corresponding linked paths; and
  setting a path through which the write-in control signal is transferred responsive to an output from said step (c).

17. The method according to claim 11, wherein each of said data storage means in said going path have the same configuration and storing data in each of said data storage means in said going path further comprises the steps of:
  receiving a data transmission signal corresponding to the write-in control signal;
  applying an activation signal to the corresponding detection at said step (c) responsive to said data transmission signal; and
  transferring said data transmission signal corresponding to the write-in control signal to a subsequent data transfer in a next stage of said going path or the corresponding linked paths responsive to an output of the corresponding detection activated by said activation signal and a data transfer acknowledging signal from a subsequent data transfer in the next stage of said going path.

18. The method according to claim 17, wherein data is stored in each of said data storage means in said returning path by the same configuration and storing data in said data storage means of said returning path comprises the steps of:
  receiving a data transmission request signal corresponding to the write-in control signal; and
  applying said data transmission request signal to a subsequent data storage means in the next stage of said returning path and storing the applied data responsive to said data transmission signal corresponding to the write-in control signal, said data transmission signal from said subsequent data storage means in the next stage of said returning path and said data transmission request signal by outputting said stored data and activating said step of outputting responsive to said data transmission request signal.

19. The method according to claim 11, wherein each of said data storage means provide handshaking transfer control for data transfer between said data storage means connected to each other.

* * * * *